United States Patent
Badenell

(10) Patent No.: US 7,739,682 B1
(45) Date of Patent: Jun. 15, 2010

(54) SYSTEMS AND METHODS FOR SELECTIVELY BLOCKING APPLICATION INSTALLATION

(75) Inventor: Jon Edward Badenell, Marietta, GA (US)

(73) Assignee: The Weather Channel, Inc., Atlanta, GA (US)

( * ) Notice: Subject to any disclaimer, the term of this patent is extended or adjusted under 35 U.S.C. 154(b) by 848 days.

(21) Appl. No.: 11/088,473

(22) Filed: Mar. 24, 2005

(51) Int. Cl.
  *G06F 9/445* (2006.01)
(52) U.S. Cl. ..................................... 717/174
(58) Field of Classification Search ................ 717/174, 717/177–178
  See application file for complete search history.

(56) References Cited

U.S. PATENT DOCUMENTS

| | | | |
|---|---|---|---|
| 5,978,590 A * | 11/1999 | Imai et al. ................... | 717/177 |
| 6,370,686 B1 * | 4/2002 | Delo et al. ................... | 717/174 |
| 7,149,789 B2 * | 12/2006 | Slivka et al. ................ | 709/219 |
| 7,287,278 B2 * | 10/2007 | Liang .......................... | 726/22 |
| 2002/0082997 A1 * | 6/2002 | Kobata et al. ................ | 705/51 |
| 2002/0174422 A1 * | 11/2002 | Kelley et al. ................ | 717/178 |
| 2003/0046447 A1 * | 3/2003 | Kouperchliak et al. ...... | 709/321 |
| 2003/0056207 A1 * | 3/2003 | Fischer et al. ............... | 717/174 |
| 2003/0229891 A1 * | 12/2003 | Neuer et al. ................. | 717/174 |
| 2005/0022012 A1 * | 1/2005 | Bluestone et al. ........... | 713/201 |
| 2005/0050378 A1 * | 3/2005 | Liang .......................... | 714/4 |
| 2006/0036570 A1 * | 2/2006 | Schaefer et al. ............. | 707/1 |
| 2006/0075140 A1 * | 4/2006 | Sobel et al. .................. | 709/245 |
| 2006/0090192 A1 * | 4/2006 | Corby et al. ................. | 726/1 |
| 2006/0218395 A1 * | 9/2006 | Maes ........................... | 713/167 |
| 2006/0224544 A1 * | 10/2006 | Keith, Jr. ..................... | 706/60 |
| 2007/0073640 A1 * | 3/2007 | Crudele et al. ............... | 707/1 |
| 2007/0143824 A1 * | 6/2007 | Shahbazi ...................... | 726/1 |

OTHER PUBLICATIONS

R. Sekar et al. "Model-Carrying Code: A Practical Approach for Safe Execution of Untrusted Applications" Oct. 2003, ACM Press, SOSP '03, vol. 37, Issue 5, pp. 15-28.*

Thomas S. Messerges et al. "Digital Rights Management in a 3G Mobile Phone and Beyond", Oct. 2003, ACM Press, DRM '03, pp. 27-38.*

Halpert, "Mobile device Security", Oct. 2004, ACM, pp. 99-101.*

* cited by examiner

*Primary Examiner*—Anna Deng
(74) *Attorney, Agent, or Firm*—Lawrence A. Aaronson, P.C.

(57) ABSTRACT

Methods and system for preventing or allowing an installer application from installing applications based on a comparison of the installer application actions to profiles and rules. The profiles and rules are established (and periodically updated) to identify a particular software installation process as undesirable and stop, it from occurring. An install blocker processes the profiles and rules and compares them against what the installer is trying to do as part of its installation process. If the installer is attempting to install an application deemed undesirable, the user could then be notified, provided all of the information about what the installer was trying to do, and provided choice to allow the installation to continue.

13 Claims, 3 Drawing Sheets

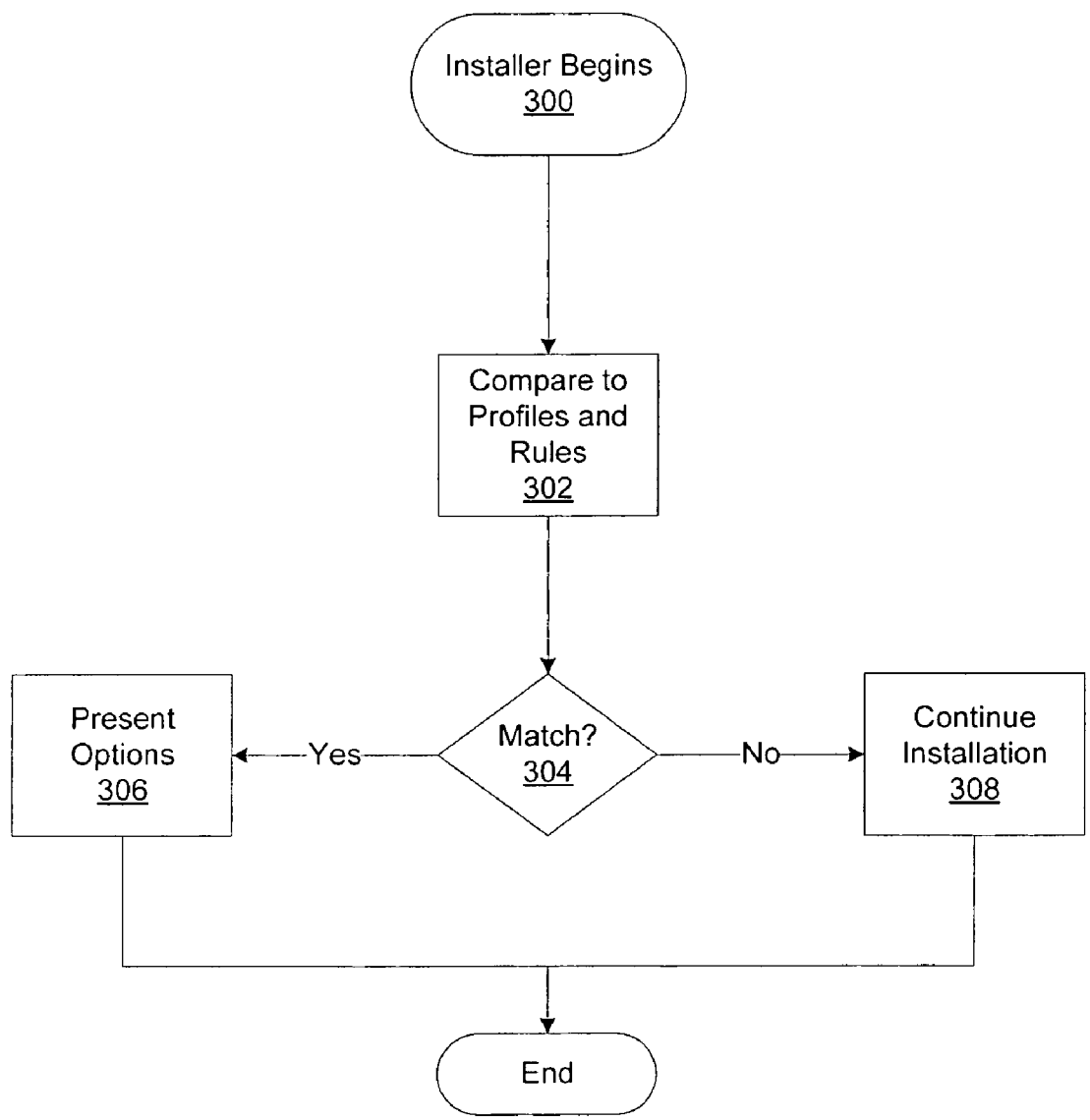

SYSTEMS AND METHODS FOR SELECTIVELY BLOCKING APPLICATION INSTALLATION

FIELD OF THE INVENTION

The present invention relates in general to the field of computer science. More particularly, the present invention relates to systems and methods for preventing the installation of unwanted bundled software.

BACKGROUND OF THE INVENTION

Desktop applications now often come with other pieces of "bundled" software that the user may have no knowledge of or interest in. An application the user is knowingly installing may well require the functionality of the bundled software, such as a game requiring a specific media player or operating system (OS) components. Such bundled software is usually acceptable to users because the software does not pose any security threats, etc. However, some bundled software is often being placed on the user's machine for someone else's benefit, such as an adware or spyware company. This type of software is not desirable.

Applications exist that detect adware or spyware, however, they only detect such adware and spyware after it has been installed on a user's computer. Thus, a user's computer is vulnerable to the ill effects of the adware and software until scanned by a detection/removal application. Another problem is that the detection/removal software often does not completely remove the adware or spyware.

There already exist a class of applications that try to detect and prevent computer viruses by looking for specific behaviors and attributes of virus software. However, there is a need for a similar type of software can protect user's computers from unwanted bundled software.

SUMMARY OF THE INVENTION

The present invention is directed to systems and methods for preventing the installation of unknown applications bundled with other applications that a user intends to install. An installer application may be prevented from installing applications based on a comparison of the installer application actions to profiles and rules. The profiles and rules are established (and periodically updated) to identify a particular software installation process as undesirable and stop it from occurring. An install blocker processes the profiles and rules and compares them against what the installer is trying to do as part of its installation process. If the installer is attempting to install an application deemed undesirable, the user could then be notified, provided all of the information about what the installer was trying to do, and provided choice to allow the installation to continue.

The foregoing and other aspects of the present invention will become apparent from the following detailed description of the invention when considered in conjunction with the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 3 is an exemplary flowchart of the processes performed by the present invention.

DETAILED DESCRIPTION OF ILLUSTRATIVE EMBODIMENTS

Figure 1:
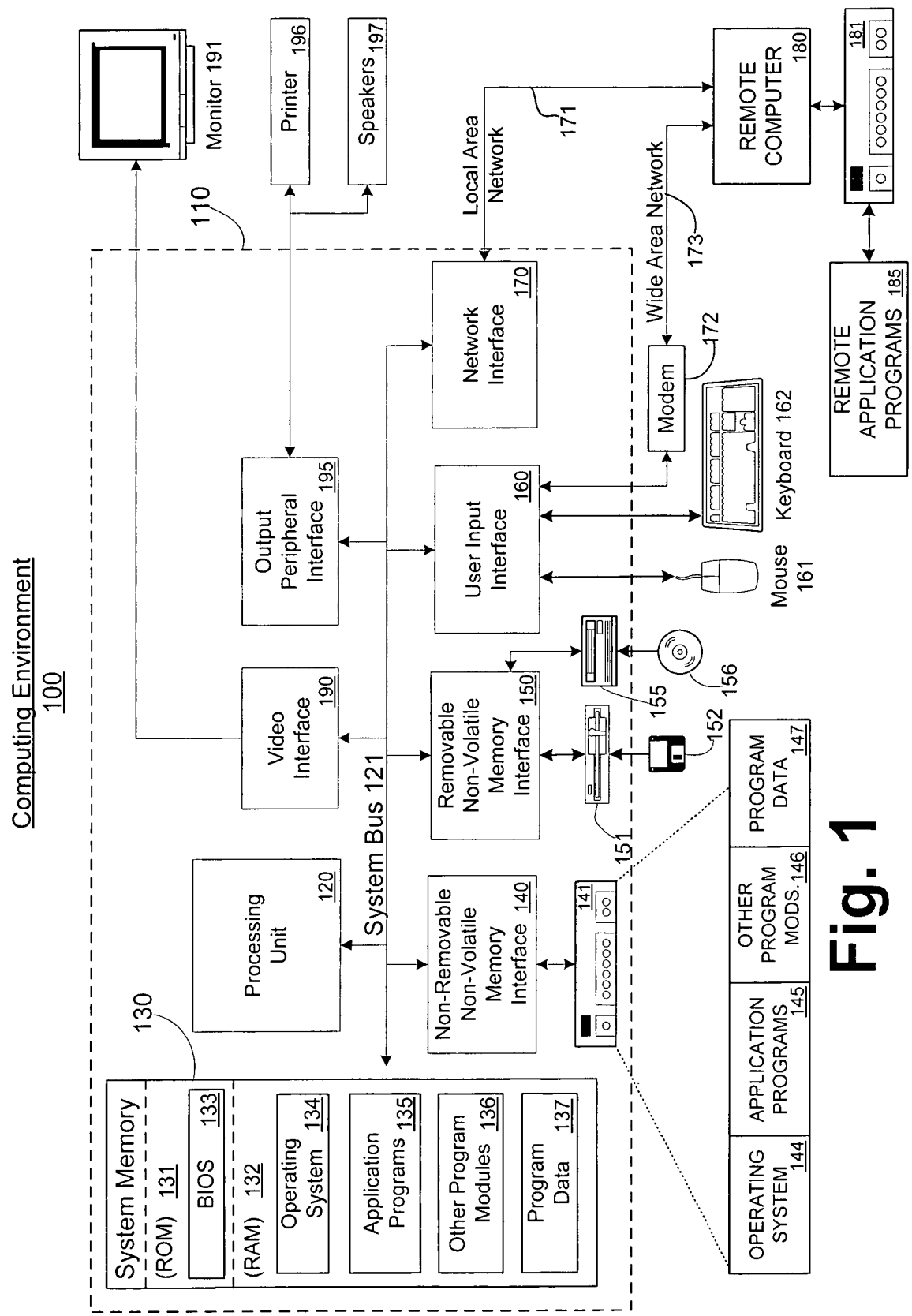
FIG. 1 is an overview of a general computing environment in which the present invention may operate.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus (also known as Mezzanine bus), Peripheral Component Interconnect Express (PCI-Express), and Systems Management Bus (SMBus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
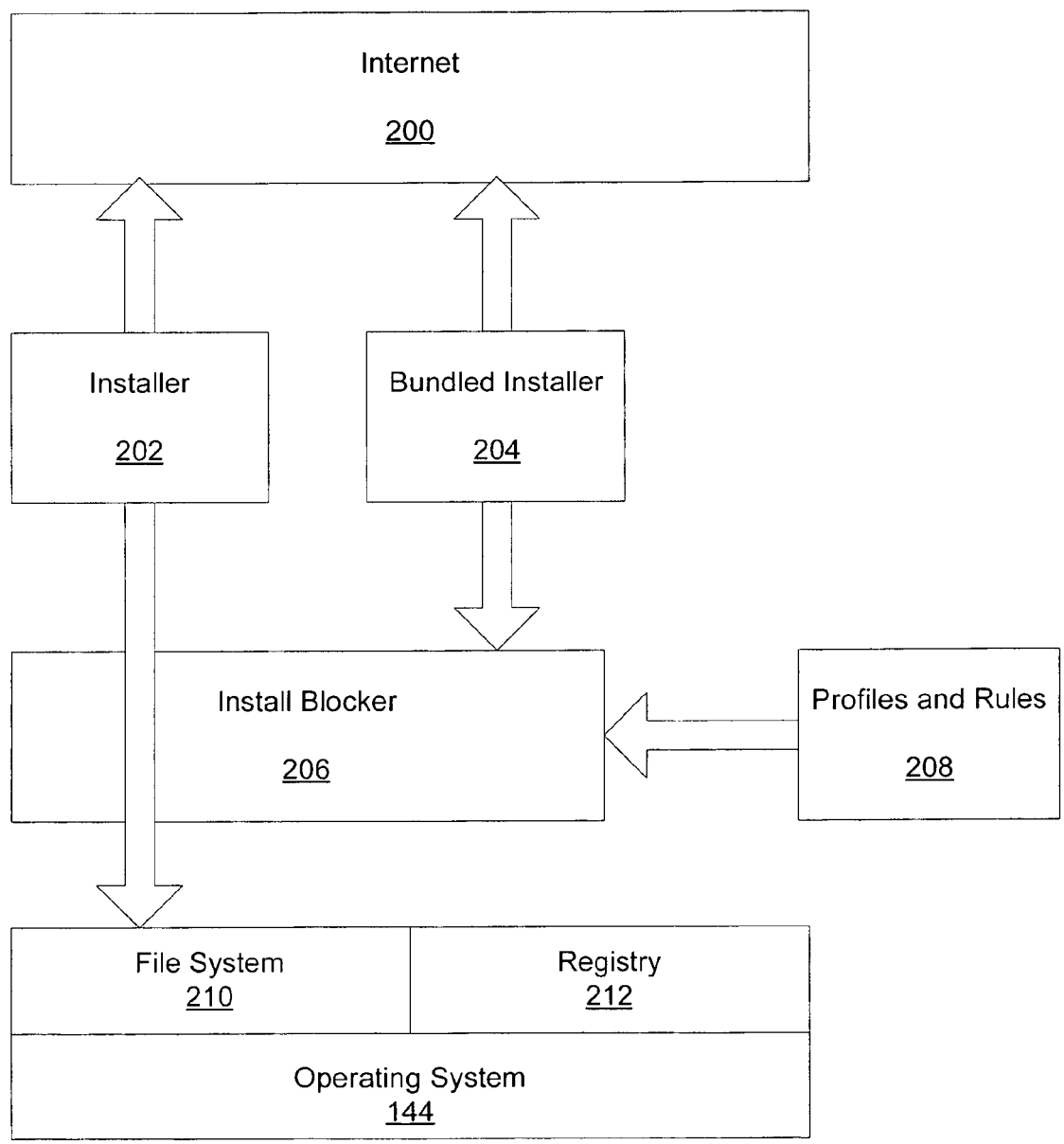
FIG. 2 is a more detailed overview of the environment in which the present invention may operate.

Referring to FIG. 2, there is illustrated an exemplary environment in which the present invention may be implemented. An installer application 202 typically behaves in a very predictable way since its function is well known. In order to install a piece of software, the installer application 202 creates directories, writes executable files to a file system 210, registers shared libraries in a registry 212, changes system configuration settings, etc., and in some cases retrieves information from the Internet 200 or other network location. The installer application 202 often is provided to install a single application or suite of applications.

Some applications are installed by a bundled installer 204 that may install several applications as part of its installation process. For example, the bundled installer 204 for a music downloading application may include a stub installer that examines component installed on the computer 110, which causes the bundled installer 204 to download any missing components. Next, bundled installer 204 may install a media player, other downloaded applications, links for paid advertisers, etc.

In all these cases, profiles and rules 208 may be established (and periodically updated) to identify a particular software installation process as undesirable and stop it from occurring. An install blocker 206 processes the profiles and rules 208 and compares them against what the bundled installer 204 (or application installer 202) is trying to do as part of its installation process. If the bundled installer 204 (or application installer 202) is attempting to install an application deemed undesirable, the user could then be notified, provided all of the information about what the installer 204 was trying to do, and provided choice to allow the installation to continue. Otherwise, the installation will halt.

Beyond comparing the installation process to those of known undesirable software packages, the install blocker 206 may also make intelligent decisions about installations that look suspicious, such as download files from multiple locations on the Internet 200 instead of just one. New profiles and rules 208 may be distributed over the Internet 200 via an auto-update procedure as new programs and behaviors are identified.

While it is preferred that the installer blocker 206 operate by blocking the installation of suspect applications (i.e., "black-listing"), the install blocker 206 may also be instructed to allow certain software applications to proceed (i.e., "white-listing") based on their name, the Internet domain they install from, their cryptographic signature, or other attributes. For example, many installers are configured to look for minimum levels of system components on a user's computer. If the minimum is not meet, the installer downloads the necessary components from the OS vendor, such as MICROSOFT, and installs them so that the original software will function. In that case, the MICROSOFT system components are not bundled software although the pattern is very similar.

FIG. 3 illustrates the processes performed by the present invention to monitor an installer and to determine if the installer behavior is acceptable. At step 300, the process begins when an installer is launched. At step 302, the installer script or current action is compared to the database of the profiles and rules to determine if it matches a profile or rule that deems the installer script or current action undesirable (e.g., the installer is attempting to install known adware, spyware, virus, Trojan horse, etc.). If the there is a match at step 304 to a rule that indicates the installer application is attempting to install a harmful or undesirable application, then at step 306, the user is presented with an option to continue the installation, otherwise the installation is halted. If there is not a match to an undesirable application at step 304, then at step 308, the installation continues as it is assumed the installer is installing a legitimate or a harmless application.

Although illustrated and described herein with reference to certain specific embodiments, the present invention is nevertheless not intended to be limited to the details shown. Rather, various modifications may be made in the details within the scope and range of equivalents of the claims and without departing from the invention.

The invention claimed is:

1. A method of blocking an installation of an application on a computing device, the computing device including a processor configured to execute the method, the method comprising:
   determining an instance of an installer, the determining including detecting actions of said installer as said installer performs the installation of the application;
   comparing actions performed by said installer as defined within an installer script to a predetermined set of rules, wherein said predetermined set of rules identify a particular software installation process as undesirable;
   preventing said installer from continuing the installation of said application based on the comparison of said actions to said predetermined set of rules; and
   updating periodically the predetermined set of rules.

2. The method of claim 1, said actions comprising at least one of writing to a file system, writing to a registry, changing configuration settings, registering shared libraries, and downloading from a network location.

3. The method of claim 1, further comprising allowing said installer to continue based on said installer meeting a second set of predetermined rules.

4. The method of claim 3, wherein said second set of predetermined rules comprises at least one of a domain name, a cryptographic signature, file attributes, and a network location.

5. The method of claim 1, further comprising applying said method to a bundled installer that installs a plurality of applications, wherein said method is applied to each of said plurality of applications individually.

6. A system for preventing an installation of an application on a computer, comprising:
   a processor;
   memory communicatively coupled with said computing processor, said memory comprising executable instructions executable by said computing processor for providing:
      a database including a predetermined set of rules that describes actions taken by an installer when installing an application, wherein said predetermined set of rules identify a particular software installation process as undesirable; and
      an install blocker application that detects actions performed by said installer during the installation of the application and compares said actions performed by said installer to said predetermined set of rules, and selectively prevents said installer from continuing the installation of said application based on the comparison of said actions to said predetermined set of rules, the predetermined set of rules being updated periodically,
      wherein said actions comprising at least one of a script to be performed by said installer, writing to a file system, writing to a registry, changing configuration settings, registering shared libraries, and downloading from a network location.

7. The system of claim 6, further comprising allowing said installer to continue based on said installer meeting a second set of rules.

8. The system of claim 6, wherein said install blocker applies operates against a bundled installer that installs a plurality of applications, wherein said install blocker compares said rules to each of said plurality of applications individually.

9. A computer readable storage medium containing instructions for a method of blocking an installation of an application on a computing device, said instructions when executed by a processor causing the processor to execute the method, the method comprising:
   determining an instance of an installer, the determining including detecting actions of said installer as said installer performs the installation of the application;
   comparing, while said installer performs the installation of the application, actions performed by said installer as defined within an installer script to a predetermined set of rules, wherein said predetermined set of rules identify a particular software installation process as undesirable;
   preventing said installer from continuing the installation of said application based on the comparison of said actins to said predetermined set of rules; and
   updating periodically the predetermined set of rules.

10. The computer readable storage medium of claim 9, said actions comprising at least one of writing to a file system, writing to a registry, changing configuration settings, registering shared libraries, and downloading from a network location.

11. The computer readable storage medium of claim 9, further comprising instructions for allowing said installer to continue based on said installer meeting a second set of predetermined rules.

12. The computer readable storage medium of claim 11, wherein said second set of predetermined rules comprises at least one of a domain name, a cryptographic signature, file attributes, and a network location.

13. The computer readable storage medium of claim 9, further comprising instructions for applying said method to a bundled installer that installs a plurality of applications, wherein said method is applied to each of said plurality of applications individually.

* * * * *